(12) United States Patent
Fu

(10) Patent No.: US 10,013,977 B2
(45) Date of Patent: Jul. 3, 2018

(54) SMART HOME CONTROL METHOD BASED ON EMOTION RECOGNITION AND THE SYSTEM THEREOF

(71) Applicant: SHENZHEN SKYWORTH-RGB ELECTRONIC CO., LTD., Shenzhen (CN)

(72) Inventor: Chunyuan Fu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 15/328,299

(22) PCT Filed: Jan. 6, 2016

(86) PCT No.: PCT/CN2016/070270
§ 371 (c)(1),
(2) Date: Jan. 23, 2017

(87) PCT Pub. No.: WO2017/084197
PCT Pub. Date: May 26, 2017

(65) Prior Publication Data
US 2017/0270922 A1    Sep. 21, 2017

(30) Foreign Application Priority Data
Nov. 18, 2015    (CN) .......................... 2015 1 07991230

(51) Int. Cl.
*G10L 25/63*     (2013.01)
*G10L 15/22*     (2006.01)
(Continued)

(52) U.S. Cl.
CPC .......... *G10L 15/22* (2013.01); *G06F 17/2735* (2013.01); *G10L 15/1815* (2013.01);
(Continued)

(58) Field of Classification Search
CPC ............... G10L 25/63; G10L 2015/088; G10L 15/1815; G10L 2015/266; G10L 17/00;
(Continued)

(56) References Cited

U.S. PATENT DOCUMENTS

| | | | | |
|---|---|---|---|---|
| 7,664,627 B2 * | 2/2010 | Mitsuyoshi | ......... | G06F 17/3061 704/1 |
| 7,983,910 B2 * | 7/2011 | Subramanian | ...... | G10L 19/0018 704/250 |

(Continued)

FOREIGN PATENT DOCUMENTS

| | | | |
|---|---|---|---|
| CN | 101446026 A | | 6/2009 |
| CN | 101604204 A | | 12/2009 |

(Continued)

OTHER PUBLICATIONS

The World Intellectual Property Organization (WIPO) International Search Report for PCT/CN2016/070270 dated Jul. 27, 2016 p. 1-5.

(Continued)

*Primary Examiner* — Martin Lerner
(74) *Attorney, Agent, or Firm* — Anova Law Group, PLLC

(57) ABSTRACT

The present invention discloses a smart home control method based on emotion recognition and the system thereof, wherein, the method comprises: acquiring a user's voice information before performing an emotion recognition for a speech tone on the voice information and generating a first emotion recognition result; after converting the voice information into a text information, performing an emotion recognition for a semantics of the text information before generating a second emotion recognition result; based on the first emotion recognition result and the second emotion recognition result, a user's emotion recognition result is generated according to a preset determination method for emotion recognition result; also, based on the user's emotion (Continued)

recognition result, each smart home device is controlled to perform a corresponding operation.

13 Claims, 5 Drawing Sheets

(51) Int. Cl.
    *G10L 15/18*     (2013.01)
    *G06F 17/27*     (2006.01)
    *G10L 17/22*     (2013.01)
    *G10L 17/06*     (2013.01)

(52) U.S. Cl.
    CPC .............. *G10L 17/06* (2013.01); *G10L 17/22* (2013.01); *G10L 25/63* (2013.01); *G10L 2015/223* (2013.01)

(58) Field of Classification Search
    CPC . G10L 17/005; G10L 17/26; G10L 2015/226; G10L 2015/223; G06F 17/2785
    USPC ........ 704/231, 236, 239, 246, 251, 270, 275
    See application file for complete search history.

(56) References Cited

U.S. PATENT DOCUMENTS

| | | | | |
|---|---|---|---|---|
| 8,204,747 | B2* | 6/2012 | Kato | G10L 17/26 704/254 |
| 8,209,182 | B2* | 6/2012 | Narayanan | G10L 17/26 704/211 |
| 8,775,186 | B2* | 7/2014 | Shin | G10L 17/26 704/270.1 |
| 9,047,871 | B2* | 6/2015 | Dimitriadis | G10L 25/63 |
| 9,570,091 | B2* | 2/2017 | Song | G10L 25/63 |
| 2003/0028384 | A1* | 2/2003 | Kemp | G10L 17/26 704/275 |
| 2005/0102135 | A1* | 5/2005 | Goronzy | G10L 15/00 704/213 |
| 2006/0080098 | A1* | 4/2006 | Campbell | G10L 13/027 704/243 |
| 2006/0167694 | A1* | 7/2006 | Mitsuyoshi | G06F 17/3061 704/270 |
| 2007/0208569 | A1* | 9/2007 | Subramanian | G10L 19/0018 704/270 |
| 2009/0313019 | A1* | 12/2009 | Kato | G10L 17/26 704/254 |
| 2010/0036660 | A1* | 2/2010 | Bennett | G10L 15/30 704/231 |
| 2011/0029314 | A1* | 2/2011 | Lin | G10L 17/26 704/270 |
| 2011/0194721 | A1* | 8/2011 | Schmidt | H04R 1/1066 381/370 |
| 2013/0121591 | A1* | 5/2013 | Hill | G10L 15/1815 382/195 |
| 2014/0114655 | A1* | 4/2014 | Kalinli-Akbacak | G10L 25/63 704/231 |
| 2016/0027452 | A1* | 1/2016 | Kalinli-Akbacak | G10L 17/26 704/240 |
| 2016/0210985 | A1* | 7/2016 | Deleeuw | G10L 25/63 |
| 2016/0217322 | A1* | 7/2016 | Kim | G10L 25/63 |
| 2017/0098447 | A1* | 4/2017 | Fu | G10L 15/08 |

FOREIGN PATENT DOCUMENTS

| | | |
|---|---|---|
| CN | 102124515 A | 7/2011 |
| CN | 102625005 A | 8/2012 |
| CN | 102855872 A | 1/2013 |
| CN | 103456314 A | 12/2013 |
| EP | 2874110 A1 | 5/2015 |
| WO | 2015047248 A1 | 4/2015 |

OTHER PUBLICATIONS

Xu, Lu et al: Chinese Emotional Speech Database for the Detection of emotion Variations, J Tsinghua Univ (Sci & Tech), vol. 49, No. S1, 6 pages, Mar. 2009, Beijing, China.

* cited by examiner

SMART HOME CONTROL METHOD BASED ON EMOTION RECOGNITION AND THE SYSTEM THEREOF

CROSS-REFERENCES TO RELATED APPLICATIONS

This application is a national stage application of PCT Patent Application No. PCT/CN2016/070270, filed on Jan. 6, 2016, which claims priority to Chinese Patent Application No. 2015107991230, filed on Nov. 18, 2015, the content of all of which is incorporated herein by reference.

FIELD OF THE INVENTION

The present invention relates to the field of smart home technology, in particular to a smart home control method based on emotion recognition and the system thereof.

BACKGROUND

An existing smart home control method for operation mainly consists of a user login on a phone, a computer sending a plurality of instructions to a plurality of intelligent devices at home, before the intelligent devices executing the corresponding user instructions. Or a voice control may be applied, for example, the user says "turn on TV" to a microphone in the phone, the phone will then send a voice instruction to a smart TV (or an intelligent control device), controlling the TV to be turned on. Currently, there is also a plurality of image control devices, controlling an operation of the intelligent devices through a plurality of the user's different expressions recognized by face recognition in an image recognition technology.

For the existing smart home control methods for operation, login on a cell phone and other terminals to operate the intelligent devices is troublesome and time-costing. And sometimes, it is needed to input a user name and a password, which is inconvenient for an elderly to operate, thus there is a problem of a security for an overall operation is not high.

Also, the existing methods for operation, still need obtain a clear instruction from the user before being able to complete the operation. An intelligent degree of the intelligent control method is still insufficient, and there is no way to achieve an automatic operation to the intelligent devices. These operation methods are not truly intelligent, they are able to neither process a relatively ambiguous instruction sent from the user, nor detect a user's mood or feeling, before adjusting a home environment intelligently.

Even adopting a relatively advanced face recognition method to control, limited by a bottleneck of an image face recognition technology, it is very difficult to achieve a real-time analysis and capture before obtaining a clear user's face image.

Therefore, the prior art has yet to be developed.

BRIEF SUMMARY OF THE DISCLOSURE

According to the above described defects, the purpose of the present invention is providing a smart home control method based on emotion recognition and the system thereof, in order to solve the problem in the prior art that, the intelligent degree of the intelligent control methods is insufficient, and inconvenience for the user to operate.

In order to achieve the above mentioned goals, the technical solution of the present invention to solve the technical problem is as follows:

A smart home control method based on emotion recognition, wherein, the said method comprises:

acquiring a voice information from a user, before performing an emotion recognition for a speech tone on the said voice information and generating a first emotion recognition result;

after converting the said voice information into a text information, performing an emotion recognition for a semantics of the said text information before generating a second emotion recognition result;

based on the said first emotion recognition result and the said second emotion recognition result, a user's emotion recognition result is generated according to a preset determination method for emotion recognition result; also, based on the said user's emotion recognition result, each smart home device is controlled to perform a corresponding operation.

The said smart home control method based on emotion recognition, wherein, the step of: acquiring a voice information from a user, before performing an emotion recognition for a speech tone on the said voice information and generating a first emotion recognition result, comprises specifically:

after obtaining a user's voice information, based on a Chinese emotional speech database for the detection of emotion variations, the speech tones of the said voice information is matched before generating the said first emotion recognition result.

The said smart home control method based on emotion recognition, wherein, after converting the said voice information into a text information, the said step of: performing an emotion recognition for a semantics of the said text information before generating a second emotion recognition result, comprises specifically:

selecting a plurality of commendatory words acting as seeds and a plurality of derogatory words acting as seeds, before generating an emotion dictionary;

calculating a similarity between the words in the said text information and the commendatory-seed-words together with the derogatory-seed-words in the said emotion dictionary, respectively;

generating the said second emotion recognition result through a preset emotion recognition method for semantics, according to the said word similarity.

The said smart home control method based on emotion recognition, wherein, the said step of calculating a similarity between the words in the said text information and the commendatory-seed-words together with the derogatory-seed-words in the said emotion dictionary, respectively, comprises specifically:

based on a calculation method for semantic similarity, calculating respectively the word similarity between the words in the said text information and the said commendatory-seed-words, as well as the word similarity between the words in the said text information and the said derogatory-seed-words.

The said smart home control method based on emotion recognition, wherein, the said step of: generating the said second emotion recognition result through a preset emotion recognition method for semantics, according to the said word similarity, comprises specifically:

Calculating a word emotion tendency value through a word emotion tendency calculation formula:

$$QG(w) = \frac{\sum_{i}^{n} \text{similarity}(K_{P_i}, w)}{M} - \frac{\sum_{i}^{n} \text{similarity}(K_{n_i}, w)}{N};$$

Wherein, w denotes a word in the text information, $K_p$ represents the commendatory-seed-word, M denotes a number of the commendatory-seed-words, $K_n$ represents the derogatory-seed-word, N denotes a number of the derogatory-seed-words, QG(w) indicates a word emotional tendency score; similarity($K_{p_i}$,w) denotes a word similarity degree between the words and the commendatory-seed-words; similarity($K_{n_i}$, w) denotes a word similarity degree between the words and the derogatory-seed-words;

when the said word emotional tendency score is larger than a preset threshold, the words in the text information will be determined having a commendatory emotion;

when the said word emotional tendency score is less than a preset threshold, the words in the text information will be determined having a derogatory emotion.

The said smart home control method based on emotion recognition, wherein, after the step of: based on the said first emotion recognition result and the said second emotion recognition result, a user's emotion recognition result is generated according to a preset determination method for emotion recognition result; also, based on the said user's emotion recognition result, control each smart home device to perform the corresponding operation, it further comprises:

based on a preset database for speech features, matching the semantic feature of the said user's voice information to determine a user's identity.

The said smart home control method based on emotion recognition, wherein, the said first emotion recognition result comprises five levels of emotion types including a high-level commendatory emotion, a low-level commendatory emotion, a neutral emotion, and a high-level derogatory emotion, as well as a low-level derogatory emotion;

the emotion types included in the said second emotion recognition result are the same as that included in the first emotion recognition result.

The said smart home control method based on emotion recognition, wherein, the said method further comprises:

when the said first emotion recognition result is a commendatory emotion, while the second emotion recognition result is a derogatory emotion or when the said first emotion recognition result is a derogatory emotion, while the second emotion recognition result is a commendatory emotion, recollecting the voice information of the current user;

redoing the speech tone analysis and semantic emotion analysis for the current user's voice information, and generating a new first emotion recognition result and a new second emotion recognition result.

The said smart home control method based on emotion recognition, wherein, the said preset emotion recognition result determination method comprises specifically:

when the said first emotion recognition result and the second emotion recognition result are different levels of commendatory emotion, determining the current user emotion recognition result as a low level commendatory emotion;

when the first emotion recognition result and the second emotion recognition result are different levels of derogatory emotion, determining the current user emotion recognition result as a low level derogatory emotion;

when one of the first emotion recognition result and the second emotion recognition result is a neutral emotion, while the other is a derogatory or commendatory emotion, determining the current user emotion recognition result as the said commendatory or derogatory emotion.

A smart home control system based on emotion recognition, wherein, the said control system comprises:

a first recognition and acquisition module, applied to acquiring a voice information from a user, generating the first emotion recognition result after the speech tone emotion recognition to the said voice information;

a second recognition and acquisition module, applied to converting the said voice information into text information; generating the second emotion recognition result after the semantic emotion recognition to the said text information;

a comprehensive emotion determination and control module, applied to generating the user emotion recognition result according to a preset determination method for emotion recognition result, based on the first emotion recognition result and the second emotion recognition result, and controlling each smart home device to perform the corresponding operation according to the said user's emotion recognition result.

Benefits: The present invention provides a smart home control method based on emotion recognition and the system thereof, it automatically controls the smart home devices through the method based on the user's emotion recognition, and through analyzing the user's voices, intonation and sentence contents in chatting or controlling sentences with the equipment, it distinguishes the user's current mood from anger, impatience, neutral, joy and happiness etc., so as to automatically control the smart home devices, and improve the user's mood by changing the surrounding environment conditions, it has a relatively good intelligence degree, being able to tap an implicit information from the user's speech. In addition, it adopts an integrated method of combining the speech tone recognition method and the semantic emotion analysis method together to further improve an accuracy of the emotion recognition.

DETAILED DESCRIPTION OF EMBODIMENTS

The invention provides a smart home control method based on emotion recognition and the system thereof. In order to make the purpose, technical solutions and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
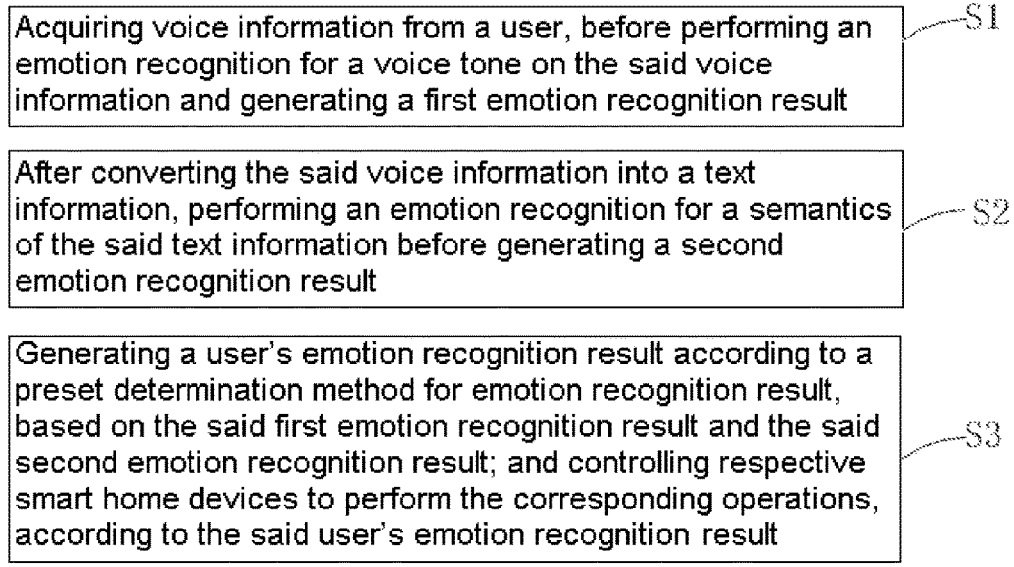
FIG. 1 illustrates a flowchart of a preferred embodiment on a smart home control method based on emotion recognition as provided in the present invention.

As shown in FIG. 1, it is a flowchart of a preferred embodiment on a smart home control method based on emotion recognition as provided in the present invention. It should be noted that the method described in the present invention may be applied to any suitable and manageable smart home systems with a certain computing power, to improving an intelligibility of an interaction between the smart home systems and the user.

Some common improvements to the said method described in the present invention, or applying the present invention to other interaction fields between intelligent devices and users, including mobile phones, tablet computers, etc., are also belonging to substitutes or variations of conventional technical means in the field. A person skilled in the art may apply the method and system of the present invention to other suitable interaction areas between users and intelligent devices after some common changes, to improving the intelligence level of the intelligent devices.

The said method comprises:

S1. acquiring a voice information from a user, before performing an emotion recognition for a speech tone on the said voice information and a first emotion recognition result is generated.

The said voice information may be a user's voice instruction, a user's voice conversation, or other suitable audio information that can be collected by the device.

Prior to the emotion recognition for the audio information, it may also perform a plurality of pre-treatments such as Gaussian filtering and more, to reduce a processing difficulty of subsequent emotion recognitions.

S2. After converting the said voice information into text information, performing an emotion recognition for a semantics of the said text information before generating a second emotion recognition result.

Specifically, the said first emotion recognition result may comprise five levels of emotion types, including a high-level commendatory emotion and a low-level commendatory emotion, a neutral emotion, as well as a high-level derogatory emotion and a low-level derogatory emotion; the said second emotion recognition result includes the same emotional types as the first emotion recognition result.

For the sake of simplicity, five terms are used here: "anger", "impatience", "neutral", "joy" and "happiness", corresponding to these five different levels of emotions. Of course, in order to further refine the emotion recognition result, further subdivisions or simplifications may be applied to the above said emotion types.

S3. Generating a user's emotion recognition result according to a preset determination method for emotion recognition result, based on the said first emotion recognition result and the said second emotion recognition result; before controlling respective smart home devices to perform the corresponding operations, according to the said user's emotion recognition result.

The said smart home appliance may comprise a plurality of suitable household devices, including a television, an air conditioner, etc., during a process of using the smart home appliances, some devices, such as an air purifier, a coffee maker, etc., may also be added or removed.

Since emotion recognition is a relatively complex problem for computers, therefore, in the step S3, applying a method of integrating the first emotion recognition result obtained in the step S1 and the second emotion recognition result obtained in the step S2 may avoid an error caused by a single emotion recognition algorithm, and may obtain a more accurate result, making a finally generated result on a user's emotion recognition not significantly different from a real situation (for example, when the user's emotion is a significant derogatory emotion, it is identified as a commendatory emotion).

Specifically, the said corresponding operation refers to an operation corresponding to a current mood of the user. For example, when the user's current mood is identified as impatience, the smart home system will automatically turn on a soothing music, open an air purifier, and send an instruction to an AC to lower a room temperature a little bit, after the current room temperature is detected relatively high by a temperature sensor, before making the user calm down.

At the same time, a plurality of tips for removing irritability and keeping healthy will be shown on a TV screen according to a current season and climate; It may also automatically send an instruction on making a cup of milk for the user, and even it may change a color of a wall and an indoor light to adjust the user's mood.

While the mood is identified as happiness, it will automatically broadcast a plurality of news and recommended movies for the user; it may also suggest the user doing some aerobic exercises to maintain a good body health; or it will play a dynamic music and so on. If the user's current mood is identified as neutral: the smart home system will automatically play a small joke, recommend a plurality of comedy movies, or make a coffee for the user and so on.

A plurality of the above said actions of the intelligent devices are performed in a coherent manner and operated by a control system of the smart home. The specific action is determined by an actual situation (for example, type of the intelligent device, a plurality of intelligent devices manageable, etc.). Of course, it may also adopt a user-defined method, combining freely a plurality of events according to the user's own habit.

Specifically, the said step of acquiring a voice information from a user, before performing an emotion recognition for the speech tone of the said voice information and generating a first emotion recognition result (that is, a speech tone emotion recognition), comprises specifically:

after acquiring a voice information of the user, based on a Chinese emotional speech database for the detection of emotion variations, the voice intone of the said voice information is matched and thereby the first emotion recognition result is generated.

A detailed introduction of the said Chinese emotional speech database for the detection of emotion variations (i.e., a CESD speech database) may be referenced to a paper of "Chinese emotional speech database for the detection of emotion variations", by: Lu Xu, Mingxing Xu, from "NCMMSC2009".

The CESD speech database has recorded 1200 utterances in a form of dialogues between man and woman, with 20 emotional variation modes consisting of 5 different basic emotions including anger, impatience, neutral, joy, and happiness. Besides the utterances, the database further includes a plurality of corresponding label files including a plurality of silence or effective speech segments, emotional classes, emotional variation segments, and emotional qualities, as well as a plurality of feature files with acoustical features stored together in the same database. It may make a pretty good emotional recognition for a user's speech.

Figure 2:
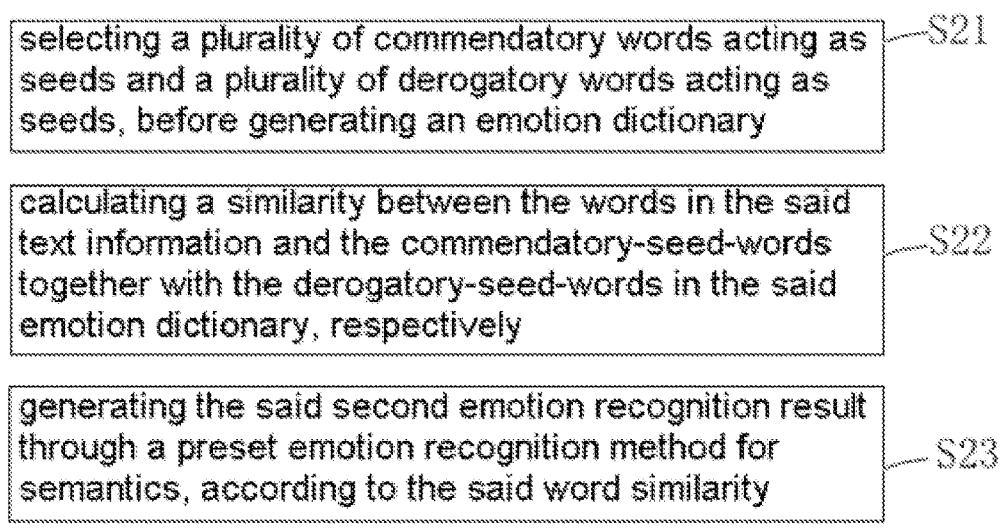
FIG. 2 illustrates a flowchart of a specific embodiment on a step S2 of a smart home control method based on emotion recognition as provided in the present invention.

More specifically, as shown in FIG. 2, the said step of performing an emotion recognition for a semantics of the said text information before generating a second emotion recognition result, after converting the said voice information into a text information (i.e., the semantics emotional recognition), further includes:

S21, selecting a plurality of commendatory words acting as seeds and a plurality of derogatory words acting as seeds, before generating an emotion dictionary. The said emotion dictionary mainly includes two categories of emotional words dictionary and emotional phrases dictionary.

Wherein, the said emotional words dictionary is composed by a plurality of words with emotional characteristics, those words such as "love", "hate" and other words, are all belonging to a vocabulary of the emotional words dictionary. The emotional phrases dictionary is composed by phases with emotional characteristics, those phases such as "in great delights", "have one's nose in the air" and other terms, are all belonging to the emotional phases dictionary.

In the emotion dictionary, terms (including emotional words and emotional phrases) are usually divided into three categories: commendatory (e.g., beauty, happy, etc.), derogatory (e.g., ugly, depressed, etc.) and neutral (such as computer, work, etc.).

S22, calculating a similarity between the words in the said text information and the commendatory-seed-words together with the derogatory-seed-words in the said emotion dictionary, respectively.

A value of an emotional weight (also known as an emotional tendency) of an emotional word is closely related to closeness between the word and the seed-word (i.e., a similarity between words).

The term "seed-word" used here is denoting a very significant, strong, and representative term. It may be considered that the closer the relationship between a word and the derogatory-seed-word is, the more significant the derogatory tendency of the word is. Similarly, the closer the relationship between a word and the commendatory-seed-word is, the more significant the commendatory tendency of the word is.

Specifically, the word similarity may be calculated between the words in the said text information and the said commendatory-seed-words, as well as the word similarity between the words in the said text information and the said derogatory-seed-words, according to a semantic similarity calculation method. The word similarity calculation in HowNet is based on an original meaning of the word. HowNet has composed a tree by a plurality of sememes in a same category, thus converting a sememe similarity calculation into a semantic distance calculation between the sememes in the tree. Assuming that a path distance of two sememes in this hierarchical system is d, then the semantic distance of the two sememes is:

$$Sim(p_1, p_2) = \frac{a}{d+a},$$

wherein: $p_1$, $p_2$ stands for the sememe; a is an adjustable parameter.

A word has several sememes in HowNet, when the word similarity is calculated based on this, a maximum of a similarity degree in sememes is taken as the similarity degree in the words. For two Chinese words, $w_1$, $w_2$, assuming that each of them has more than one sememe, the sememes of $w_1$ are $s_{11}$, $s_{12}$, ... $s_{1n}$, the sememes of $w_2$ are $s_{21}$, $s_{22}$, ... $s_{2n}$. The similarity calculation formula is as follows:

$$\text{Similarity}(w_1, w_2) = \max_{i=1\ldots n, j\ldots m}(s_{1i}, s_{2j}) \qquad (1)$$

In order to be corresponding to the above said five levels of emotion types, it may define an emotional polarity for each emotion word. That is, the emotional polarity is divided into two levels of strong and weak. The emotional polarity indicates the semantic similarity degree between words, the higher the similarity is, the stronger the polarity is, and vice versa.

S23. generating the said second emotion recognition result through a preset emotion recognition method for semantics, according to the said word similarity.

More specifically, the step (S23) of generating the said second emotion recognition result through a preset emotion recognition method for semantics, according to the said word similarity includes specifically:

Calculating a word emotion tendency value through a word emotion tendency calculation formula:

$$QG(w) = \frac{\sum_i^n \text{similarity}(K_{p_i}, w)}{M} - \frac{\sum_i^n \text{similarity}(K_{n_i}, w)}{N}; \qquad (2)$$

Wherein, w denotes a word in the text information, $K_p$ represents the commendatory-seed-word, M denotes a number of the commendatory-seed-words, $K_n$ represents the derogatory-seed-word, N denotes a number of the derogatory-seed-words, QG(w) indicates a word emotional tendency score; similarity($K_p$, w) denotes the word similarity degree between the words and the commendatory-seed-words; similarity($K_{n_i}$,w) denotes the word similarity degree between the words and the derogatory-seed-words;

N and M are both positive integers, which may be equal or unequal.

When the said word emotional tendency score is larger than a preset threshold, the word in the text information is determined having a commendatory emotion. While the said word emotional tendency score is less than a preset threshold, the word in the text information is determined having a derogatory emotion.

Further, the words in the commendatory words are divided into strong and weak levels according to their values between [0, 1], and the words in the derogatory words are directly divided into strong and weak words according to their values between [−1, 0], which are corresponding to the above said five levels of emotional types: anger, impatience, neutral, joy, and happiness, respectively. For example, if the polarity value of a word is larger than 0.5, it is happiness; if less than 0.5, it is joy. And if the polarity value is larger than −0.5, then it is impatience; if it is less than −0.5, it is anger.

Preferably, after the said step S3, the method further comprises:

based on a preset database for speech features, matching the semantic feature of the said user's voice information to determine a user's identity.

That is, constructing a voice features database by pre-recording the voice samples and extracting a unique feature for each sample, before matching the voice for detection with the features in the database, and verifying the identity of a speaker by analysis and calculation. The above said user's verification method with a voiceprint is a user-friendly operation, which needs no memorization of a user's ID and password. Also, it has a better security, and may ensure an accurate identification of a user's identity.

In a specific embodiment of the invention, the said method further comprises: when the said first emotion recognition result is a commendatory emotion, and the second emotion recognition result is a derogatory emotion, or when the said first emotion recognition result is a derogatory emotion, and the second emotion recognition result is a commendatory emotion, the speech information of the current user shall be recollected;

redoing the speech tone analysis (S1) and the semantic emotion analysis (S2) for the current user's voice information, before generating a new first emotion recognition result and a new second emotion recognition result.

Due to a complexity of the emotion recognition, there may be a contradictory situation between two emotion recognition results. In this case, in order to ensure an accuracy of the recognition results, recollecting the data and redo the identification is a better approach.

Specifically, the emotion recognition result determination method preset in the step S3 is specifically stated as follows:

when the said first emotion recognition result and the second emotion recognition result are different levels of commendatory emotion, determining the current user emotion recognition result as a low level commendatory emotion;

when the first emotion recognition result and the second emotion recognition result are different levels of derogatory emotion, determining the current user emotion recognition result as a low level derogatory emotion;

when one of the first emotion recognition result and the second emotion recognition result is a neutral emotion, and the other is a derogatory or commendatory emotion, then the current user emotion recognition result is determined as the said commendatory or derogatory emotion.

All together, when both the first emotion recognition result and the second emotion recognition result have an emotion tendency (commendatory or derogatory), it adopts a degradation method by choosing a lower emotion type. And when one of the two is a neutral result, choosing the result with emotional tendency.

After applying this method, a plurality of determination results obtained corresponding to the above said five emotion types are shown in table 1 as follows:

TABLE 1

| The first emotion recognition result | The second emotion recognition result | The user emotion recognition result |
| --- | --- | --- |
| anger | anger | anger |
| anger | impatience | impatience |
| impatience | impatience | impatience |
| happiness | happiness | happiness |
| happiness | joy | joy |
| joy | joy | joy |
| anger | neutral | anger |
| impatience | neutral | impatience |
| happiness | neutral | happiness |
| joy | neutral | joy |
| neutral | neutral | neutral |

Figure 3:
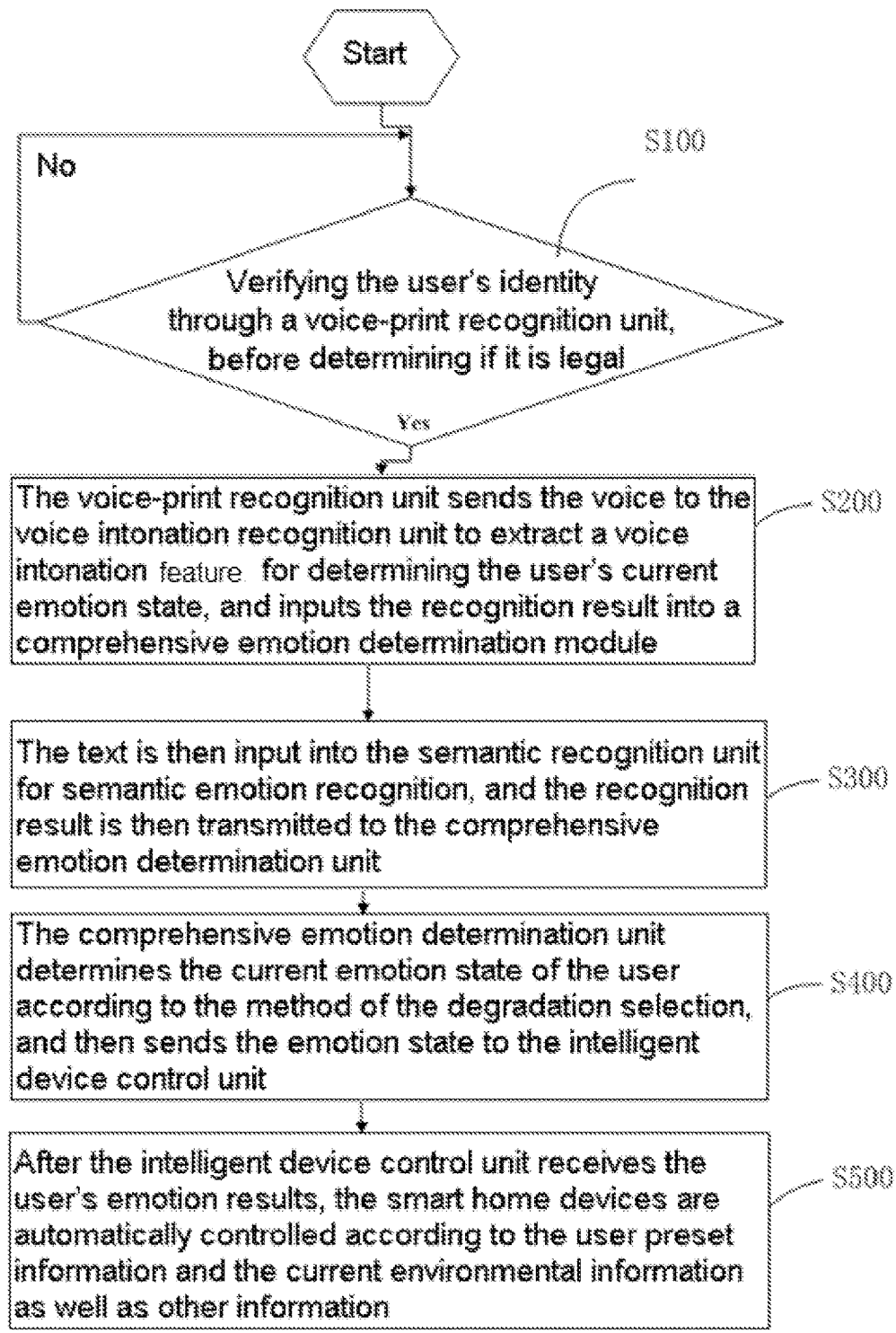
FIG. 3 illustrates a flowchart of a specific embodiment on a smart home control system based on emotion recognition as provided in the present invention.

FIG. 3 illustrates a flowchart of a specific embodiment on a smart home control system based on emotion recognition as provided in the present invention, as shown in FIG. 3, the specific embodiment comprises the following steps:

S100. when the user inputs an instruction or a chat content by voice, the smart home system verifies the user's identity through a voiceprint recognition unit while chatting with the user after receiving the user's voice. If it is a legitimate user, then go to a step S200.

Otherwise, it will record the user's voiceprint information through chatting with the user, and make the user legal.

S200. The voiceprint recognition unit sends the voice to the voice intonation recognition unit to extract a voice intonation featuer for determining the user's current emotion state (that is, an emotion recognition result), and inputs the recognition result into a comprehensive emotion determination module. The module then sends the user's voice to a voice-to-text module before converting into texts.

S300. The text is then input into the semantic recognition unit for semantic emotion recognition, and the recognition result is then transmitted to the comprehensive emotion determination unit.

S400. The comprehensive emotion determination unit determines the current emotion state of the user according to the method of the degradation selection, and then sends the emotion state to the intelligent device control unit.

S500. After the intelligent device control unit receives the user's emotion results, the smart home devices are automatically controlled according to the user preset information and the current environmental information as well as other information.

Figure 4:
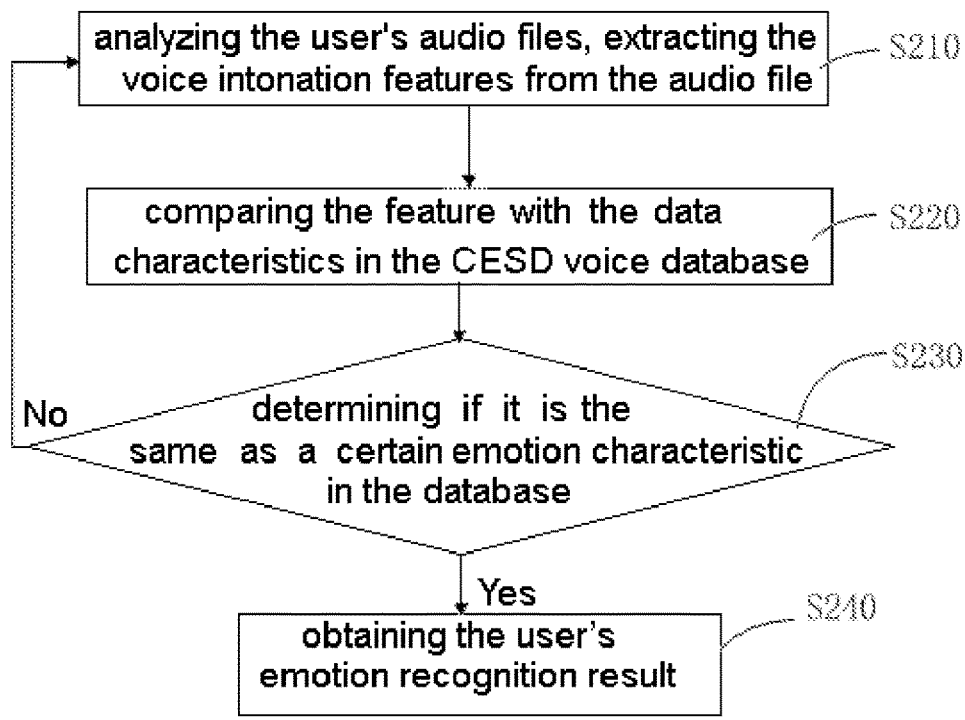
FIG. 4 illustrates a flowchart of a specific embodiment on a voce tone recognition unit in a smart home control system based on emotion recognition as provided in the present invention.

Wherein, as shown in FIG. 4, the specific process of the voice intonation recognition includes:

S210. analyzing the user's audio files, extracting the voice intonation features from the audio file.

S220. comparing the feature with the data characteristics in the CESD voice database.

S230. determining if it is the same as a certain emotion characteristic in the database, and if it is, go to step S240.

If it is not, (that is, It fails to match any emotional characteristics in the database), then a re-acquiring the user's speech analysis features before going back to the step S210.

S240. obtaining the user's emotion recognition result.

Figure 5:
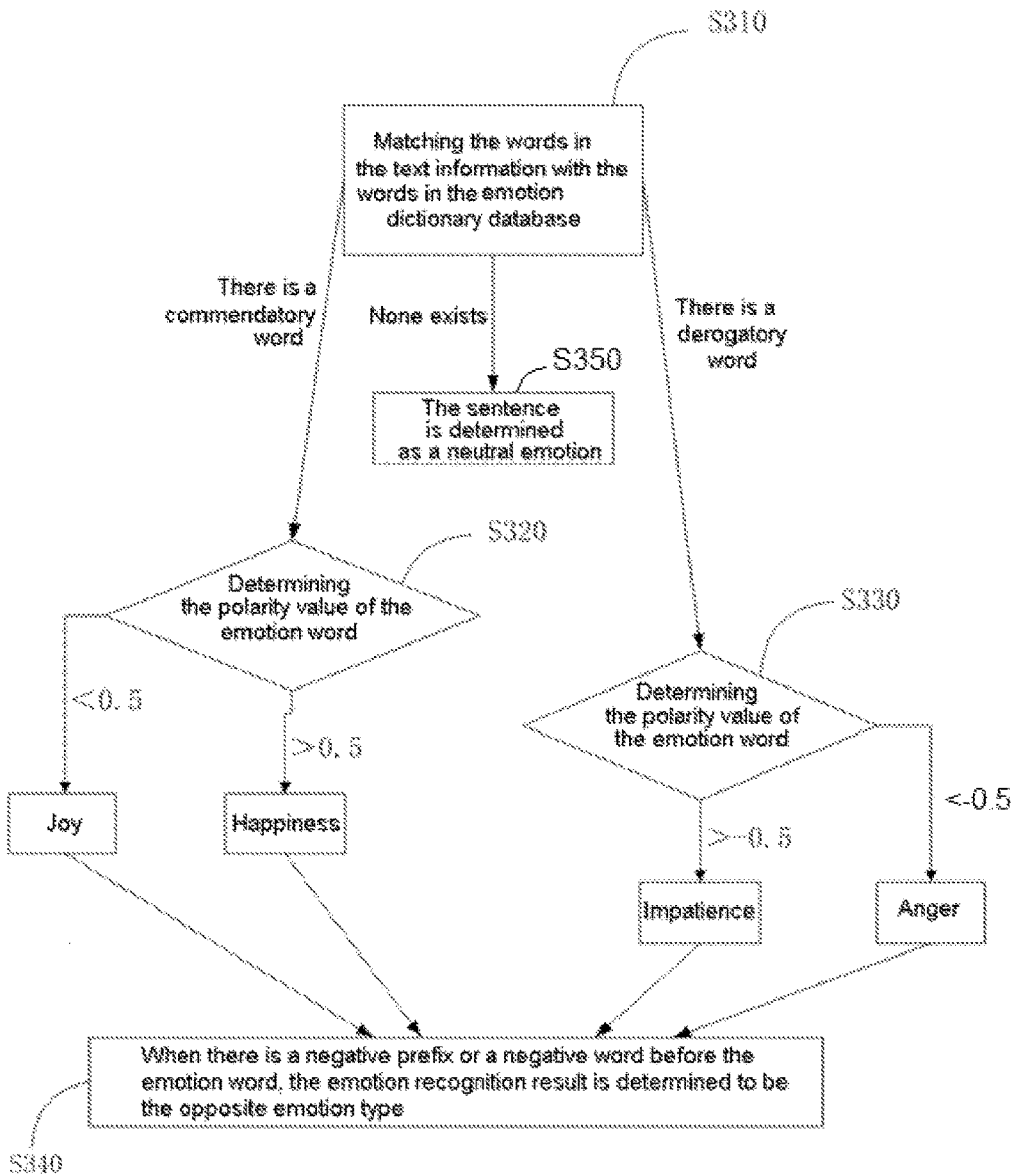
FIG. 5 illustrates a flowchart of a specific embodiment on a text emotion recognition unit in a smart home control system based on emotion recognition as provided in the present invention.

Further, as shown in FIG. 5, the specific process of the text emotion recognition unit includes:

S310. matching the words in the text information with the words in the emotion dictionary database, if there is a commendatory word, then go to S320; if there is a derogatory word, then go to S330; if none exists, the sentence is determined as the neutral emotion (S350);

S320, determining the polarity value of the emotion word, if the polarity value is larger than 0.5, then it is happiness; if the polarity value isless than 0.5,then it is joy.

S330, determining the polarity value of the emotion word, if the polarity value is larger than -0.5, then it is impatience; if the polarity value isless than -0.5,then it is anger.

S340, when there is a negative prefix or a negative word before the emotion word, the emotion recognition result is determined to be the opposite emotion type (for example, happiness is corresponding to anger, joy is corresponding to impatience).

Figure 6:
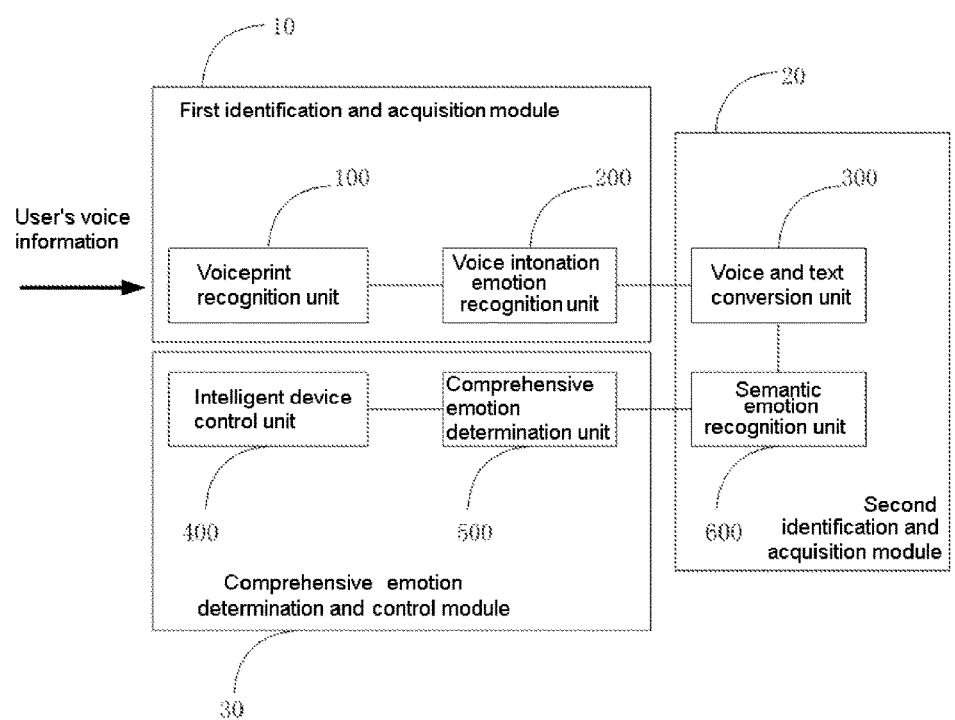
FIG. 6 illustrates a functional block diagram of a preferred embodiment on a smart home control method based on emotion recognition as provided in the present invention.

Based on the above said embodiments, the present invention further provides a smart home control system based on emotion recognition. As shown in FIG. 6, the said smart home control system based on emotion recognition includes:

a first recognition and acquisition module 10, applied to acquiring a voice information from a user, generating the first emotion recognition result after the speech tone emotion recognition to the said voice information;

a second recognition and acquisition module, applied to converting the said voice information into text information; generating the second emotion recognition result after the semantic emotion recognition to the said text information;

a comprehensive emotion determination and control module, applied to generating the user emotion recognition result according to a preset determination method for emotion recognition result, based on the first emotion recognition result and the second emotion recognition result, and controlling each smart home device to perform the corresponding operation according to the said user's emotion recognition result.

In specific implementations, as shown in FIG. 6, the said first identification and acquisition module 10 may include a voiceprint recognition unit 100 which is applied to acquiring the user's voice information, and a voice intonation emotion recognition unit 200 for performing the voice intonation emotion recognition of the said voice information to generate the first emotion recognition result.

The second identification and acquisition module 20 may include a voice and text conversion unit 300, applied to converting the voice information into the text information, and a semantic emotion recognition unit 600, applied to generating the second emotion recognition result for the semantic emotion recognition of the text information.

The comprehensive emotion determination and control module 30 may include a comprehensive emotion determination unit 500, applied to generating a user's emotion recognition result according to a predetermined emotion recognition result determination method, and an intelligent device control unit 400, applied to controlling each smart home device to perform the corresponding operation according to the user emotion recognition result, based on the first emotion recognition result and the second emotion recognition result.

The present invention provides a smart home control method based on emotion recognition and the system thereof, automatically controls the smart home devices through the method based on the user's emotion recognition, and analyzes the user's voices, intonation and sentence contents in chatting or controlling sentences with the equipment, to distinguish the user's current mood from an angry, anxious, neutral, pleasant and happy status etc., so as to automatically control the smart home devices, and improving the user's mood by change the surrounding environment conditions, which has a relatively good intelligence degree, being able to tap an implicit information from the user's voice. In addition, it adopts an integrated method of combining the speech tone recognition and the semantic emotion analysis methods to further improve an accuracy of the emotion recognition.

All above, the present invention provides a smart home control method based on emotion recognition and the system thereof, it automatically controls the smart home devices through the method based on the user's emotion recognition, and through analyzing the user's voices, intonation and sentence contents in chatting or controlling sentences with the equipment, it distinguishes the user's current mood from anger, impatience, neutral, joy and happiness etc., so as to automatically control the smart home devices, and improve the user's mood by changing the surrounding environment conditions, it has a relatively good intelligence degree, being able to tap an implicit information from the user's speech. In addition, it adopts an integrated method of combining the speech tone recognition method and the semantic emotion analysis method together to further improve an accuracy of the emotion recognition.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A smart home control method comprising:
   acquiring a voice information from a user;
   performing a first emotion recognition for a speech tone on the voice information and generating a first emotion recognition result;
   converting the voice information into a text information;
   performing a second emotion recognition for a semantics of the text information and generating a second emotion recognition result;
   based on the first emotion recognition result and the second emotion recognition result, generating a user's emotion recognition result according to a preset determination method for emotion recognition result; and
   based on the user's emotion recognition result, controlling a smart home device to perform a corresponding operation,
   wherein the first emotion recognition result is a commendatory emotion, while the second emotion recognition result is a derogatory emotion or the first emotion recognition result is a derogatory emotion, while the second emotion recognition result is a commendatory emotion, recollecting the voice information of the user; and redoing the first emotion recognition and the second emotion recognition for the voice information and generating a new first emotion recognition result and a new second emotion recognition result.

2. The smart home control method according to claim 1, wherein, the step of: acquiring a voice information from a user; performing a first emotion recognition for a speech tone on the voice information and generating a first emotion recognition result, comprises:
   after obtaining the voice information, matching the speech tone of the voice information according to a Chinese emotional speech database to detect emotion variations, and generating the first emotion recognition result.

3. The smart home control method according to claim 1, after the step of: based on the first emotion recognition result and the second emotion recognition result, generating a user's emotion recognition result according to a preset determination method for emotion recognition result; and based on the user's emotion recognition result, controlling a smart home device to perform the corresponding operation, further comprising:
   based on a preset database for speech features, matching the semantic feature of the user's voice information to determine a user's identity.

4. The smart home control method according to claim 1, wherein:
   the first emotion recognition result comprises five levels of emotion types including a high-level commendatory emotion, a low-level commendatory emotion, a neutral emotion, a high-level derogatory emotion, and a low-level derogatory emotion; and
   the emotion types included in the second emotion recognition result are the same as the emotion types included in the first emotion recognition result.

5. The smart home control method according to claim 4, wherein, the preset determination method for emotion recognition result comprises:
   when the first emotion recognition result and the second emotion recognition result have different levels of commendatory emotion, determining a current user emotion recognition result as a low level commendatory emotion;
   when the first emotion recognition result and the second emotion recognition result are different levels of derogatory emotion, determining the current user emotion recognition result as a low level derogatory emotion;

when one of the first emotion recognition result and the second emotion recognition result is a neutral emotion, while the other is the derogatory emotion or the commendatory emotion, determining the current user emotion recognition result as the commendatory emotion or the derogatory emotion.

6. A smart home control method comprising:
acquiring a voice information from a user;
performing a first emotion recognition for a speech tone of the voice information and generating a first emotion recognition result;
converting the voice information into a text information;
performing a second emotion recognition for a semantics of the text information and generating a second motion recognition result, comprising:
selecting a plurality of commendatory words as commendatory-seed-words and a plurality of derogatory words as derogatory-seed-words and generating an emotion dictionary;
respectively calculating a similarity between a plurality of words in the text information, the commendatory-seed-words and the derogatory-seed-words in the emotion dictionary; and
generating the second emotion recognition result through a preset emotion recognition method for semantics, according to a word similarity;
based on the first emotion recognition result and the second emotion recognition result, generating a user's emotion recognition result according to a preset determination method for emotion recognition result;
based on the user's emotion recognition result, controlling a smart home device to perform a corresponding operation;
wherein the first emotion recognition result is a commendatory emotion, while the second emotion recognition result is a derogatory emotion or the first emotion recognition result is a derogatory emotion, while the second emotion recognition result is a commendatory emotion, recollecting the voice information of the user; and redoing the first emotion recognition and the second emotion recognition for the voice information and generating a new first emotion recognition result and a new second emotion recognition result.

7. The smart home control method according to claim 6, wherein, the step of respectively calculating a similarity between the plurality of words in the text information, the commendatory-seed-words and the derogatory-seed-words in the emotion dictionary, comprises:
based on a calculation method for semantic similarity, calculating respectively the word similarity between the plurality of words in the text information and the commendatory-seed-words, and the word similarity between the plurality of words in the text information and the derogatory-seed-words.

8. The smart home control method according to claim 7, wherein, the step of: generating the second emotion recognition result through a preset emotion recognition method for semantics, according to the word similarity, comprises:
calculating a word emotion tendency value through a word emotion tendency calculation formula:

$$QG(w) = \frac{\sum_{i}^{n} \text{similarity}(K_{p_i}, w)}{M} - \frac{\sum_{i}^{n} \text{similarity}(K_{n_i}, w)}{N};$$

wherein, w denotes a word in the text information, $K_p$ represents the commendatory-seed-word, M denotes a number of the commendatory-seed-words, $K_n$ represents the derogatory-seed-word, N denotes a number of the derogatory-seed-words, QG(w) indicates a word emotional tendency score; similarity($K_{p_i}$,w) denotes a word similarity degree between the words and the commendatory-seed-words; similarity ($K_{n_i}$,w) denotes a word similarity degree between the words and the derogatory-seed-words;

when the word emotional tendency score is larger than a preset threshold, the word in the text information is determined having a commendatory emotion;

when the word emotional tendency score is less than a preset threshold, the word in the text information is determined having a derogatory emotion.

9. The smart home control method according to claim 6, wherein, the step of: acquiring a voice information from a user; performing a first emotion recognition for a speech tone on the voice information and generating a first emotion recognition result, comprises:
after acquiring the voice information of the user, matching the speech tone based on a Chinese emotional speech database to detect emotion variations and generating the first emotion recognition result.

10. The smart home control method according to claim 6, after the step of: based on the first emotion recognition result and the second emotion recognition result, generating a user's emotion recognition result according to a preset determination method for emotion recognition result; and based on the user's emotion recognition result, controlling a smart home device to perform the corresponding operation, further comprising:
based on a preset database for speech features, matching the semantic feature of the user's voice information to determine an identity of the user.

11. The smart home control method according to claim 6, wherein:
the first emotion recognition result comprises five levels of emotion types including a high-level commendatory emotion, a low-level commendatory emotion, a neutral emotion, a high-level derogatory emotion and a low-level derogatory emotion; and
the emotion types included in the second emotion recognition result are the same as the emotion types included in the first emotion recognition result.

12. The smart home control method according to claim 11, wherein, the preset determination method for emotion recognition result comprises:
when the first emotion recognition result and the second emotion recognition result are different levels of commendatory emotion, determining a current user emotion recognition result as a low level commendatory emotion;

when the first emotion recognition result and the second emotion recognition result are different levels of derogatory emotion, determining the current user emotion recognition result as a low level derogatory emotion;

when one of the first emotion recognition result and the second emotion recognition result is a neutral emotion, and the other is the derogatory emotion or the commendatory emotion, determining the current user emotion recognition result as the commendatory emotion or the derogatory emotion.

13. A smart home control system comprising:
a first recognition and acquisition module, for acquiring a voice information from a user, performing a first emotion recognition for a speech tone on the voice information and generating a first emotion recognition result;
a second recognition and acquisition module, for converting the voice information into a text information, performing a second emotion recognition for a semantics of the text information and generating a second emotion recognition result;
a comprehensive emotion determination and control module, for generating a user's user emotion recognition result according to a preset determination method for emotion recognition result, based on the first emotion recognition result and the second emotion recognition result, and controlling a smart home device to perform a corresponding operation according to the user's emotion recognition result,
wherein the first emotion recognition result is a commendatory emotion, while the second emotion recognition result is a derogatory emotion or the first emotion recognition result is a derogatory emotion, while the second emotion recognition result is a commendatory emotion, recollecting the voice information of the user; and redoing the first emotion recognition and the second emotion recognition for the voice information and generating a new first emotion recognition result and a new second emotion recognition result.

* * * * *